(12) United States Patent
Murch (10) Patent No.: US 12,274,242 B1
(45) Date of Patent: Apr. 15, 2025

(54) LEASH FOR A PET AND METHOD OF USE

(71) Applicant: Brian Alexander Murch, Needham, MA (US)

(72) Inventor: Brian Alexander Murch, Needham, MA (US)

( * ) Notice: Subject to any disclaimer, the term of this patent is extended or adjusted under 35 U.S.C. 154(b) by 301 days.

(21) Appl. No.: 18/108,097

(22) Filed: Feb. 10, 2023

Related U.S. Application Data (60) Provisional application No. 63/311,687, filed on Feb. 18, 2022.

(51) Int. Cl.
*A01K 27/00* (2006.01)

(52) U.S. Cl.
CPC .......... *A01K 27/003* (2013.01); *A01K 27/001* (2013.01)

(58) Field of Classification Search
CPC ............................ A01K 27/001; A01K 27/003
USPC .................... 119/795, 797, 798, 801–805
See application file for complete search history.

(56) References Cited

U.S. PATENT DOCUMENTS

| | | | | |
|---|---|---|---|---|
| 796,905 | A * | 8/1905 | Funk .................... | A01K 15/003 119/803 |
| 8,267,050 | B1 * | 9/2012 | Hatcher ............... | A01K 27/004 119/797 |
| 2002/0023595 | A1 * | 2/2002 | Kaufman ............. | A01K 27/003 119/797 |
| 2009/0199787 | A1 * | 8/2009 | Weinberg ............ | A01K 27/003 119/797 |
| 2011/0180015 | A1 * | 7/2011 | Larson ................. | A01K 27/001 119/863 |
| 2013/0192539 | A1 * | 8/2013 | Woodruff ............ | A01K 27/005 119/798 |
| 2015/0150222 | A1 * | 6/2015 | Schlosser ............ | A01K 27/005 29/446 |
| 2016/0015002 | A1 * | 1/2016 | Huegel ................ | A01K 27/005 119/795 |
| 2016/0165849 | A1 * | 6/2016 | Lewis .................. | A01K 27/003 119/770 |

* cited by examiner

*Primary Examiner* — Yvonne R Abbott-Lewis
(74) *Attorney, Agent, or Firm* — Ted Masters (57) ABSTRACT

A leash for a pet and method of use for donning and removing from a distance to eliminate the need for the human user to bend over or otherwise require their hands to touch or be in close proximity to the animal. The human user places the expanded collar loop of the leash over the head of the animal and subsequently secures the collar loop around the neck of the animal by pulling on the handle of the leash. A connection prevents the collar loop from unintentionally expanding when the leash is in use. The leash is removed by pulling a removal cord to expand the collar loop to allow the head of the animal to slide out from the collar loop.

22 Claims, 8 Drawing Sheets

LEASH FOR A PET AND METHOD OF USE

CROSS REFERENCE TO RELATED APPLICATION

This application claims the filing benefit under 35 U.S.C. § 119 (e) of U.S. Provisional Application No. 63/311,687, filed Feb. 18, 2022, which is hereby incorporated by reference.

FIELD OF THE INVENTION

The present invention relates to a pet leash for donning and removing from a distance. In particular, the present invention relates to a pet leash that can be secured to and removed from a pet without requiring a user's hands to touch or be directly adjacent to the animal.

BACKGROUND

Pet leashes, such as dog leashes, are used to control animals, such as for leading, training, or preventing the animal from running away. Traditional leashes are attached directly to a collar or harness that has been previously secured around the animal. These leashes require the human user to position their hands in close proximity to the animal, often even directly touching the animal.

Some animals, even when domesticated and trained, do not like to be touched in certain ways. For example, many dogs do not like having their neck touched. The reasons for this aversion to being touched can be caused by many factors, such as sensitive skin in that area, or a previously painful incident such as being pinched when a collar or leash was attached. Regardless of the reason for the aversion, an animal may act out unexpectedly when approached or touched, which can make attaching a leash a dangerous situation as the human user could get bitten or otherwise harmed by the animal.

As dangerous as it can be to attach a leash to an animal that is known to the human user, the situation becomes much more dangerous when attempting to attach a leash to an unknown animal. Even people with extensive experience with animals cannot predict how an unknown animal will react to being touched or restrained. Additionally, a traditional leash requires that a collar or harness has previously been secured around the animal, which makes the traditional leash useless when trying to control an animal without a collar or harness.

One common solution to the issues described is a slip-lead leash. These types of leashes are made of a flexible cord, such as rope, with a handle at one end and a D-ring at the opposing end. The flexible cord can be passed back through the D-ring to form a collar loop formed to go around the neck of the animal. The flexible cord can slide through the D-ring such that the collar loop can be expanded to be large enough to slide over the head of the animal, and then the collar loop is contracted around the neck of the animal by pulling on the handle end of the leash.

While this common design of a slip-lead leash is easy to secure around the animal, the leash requires constant tension between the human user and the animal to prevent the collar loop from loosening, which could allow the animal to slip its head back out and escape. One common solution to this issue is to add a slide restricting feature, such as an extra flap of material, that requires additional force to pull through the D-ring. This prevents the collar loop from loosening beyond this feature without additional input from the human user. Although this can solve the issue of unintentional loosening of the collar loop, it requires the human user to position their hand in close proximity to the animal to grasp the D-ring or collar loop to pull back past the slide restricting feature in order to expand the collar loop for removing from the animal, which can be a potentially dangerous situation as previously described.

In addition to the described potential dangers of a human user placing their hands in close proximity to the animal, human users with mobility or dexterity problems face difficulty securing and removing traditional leashes as they require the human user to bend over and operate clasps or other attachment hardware.

SUMMARY

There is a need for a pet leash that can be secured to and removed from an animal without requiring the human user to position their hands in close proximity to the animal. The present invention provides a solution for a pet leash for donning and removing from a distance. A loop of the leash is donned over the head of the animal and secured around the neck without requiring the hands of the human user to get within close proximity to the animal. After donning, the leash remains securely around the neck of the animal without additional input or tension applied by the human user. To remove the leash, a removal cord is pulled to expand the loop to allow the head of the animal to slip back out of the loop.

In accordance with an embodiment, a pet leash for donning and removing from a distance is provided. The flexible primary cord of the leash is passed back through a slider that is attached to an end of the primary cord to form a loop. The expanded loop is sized such that the loop can fit over the head of the animal. The loop is contracted by pulling on the handle of the leash to a secure and comfortable fit around the neck of the animal. A stop positioned along the loop of the primary cord can restrict the minimum size of the loop so as to not overly contract around the neck of the animal when the leash is subject to continued tension after securing to the animal. A connection between the stop and the slider can prevent the loop from unintentionally expanding when the leash is in use as to prevent the animal from possibly escaping from the leash. A removal cord connected to the slider can be pulled by the human user to expand the loop to allow the loop to slide back over the head of the animal to free the animal from the leash.

In accordance with aspects of the present invention, the primary cord of the leash includes a handle at one end and a slider at the opposing end. The primary cord is passed through the slider to form a loop. A removal cord is connected to the slider. In some aspects, friction between the slider and primary cord requires a force to move the slider along the primary cord. In some aspects, the opposing end of the removal cord from the slider is connected to the primary cord.

In accordance with aspects of the present invention, the pet leash further includes a stop connected to the loop of the primary cord to define the minimum size of the loop when the stop is in connection with the slider. In certain aspects, the stop is positionable along the loop. In additional aspects, the connection between the stop and slider requires a force to separate. In some aspects, the connection between the stop and slider is magnetic.

In accordance with aspects of the present invention, holders keep the removal cord positioned along the primary cord. In certain aspects, the removal cord is a conduit through which the primary cord passed. In some aspects, the conduit removal cord is rigid. In additional aspects, the conduit removal cord includes a tab.

In accordance with aspects of the present invention, a stop connected to the loop is also connected via a tether to a sleeve that is slidably connected to the loop. The sleeve is configured to connect to the slider. In certain aspects, a force is required to break the connection between the sleeve and the slider. In some aspects, the connection between the sleeve and slider is magnetic. In some aspects, the stop and slider are biased to a separated position.

In accordance with aspects of the present invention, a positionally fixed stop is connected to the loop and configured to magnetically connect to the slider such that a force is required to separate the connection between the stop and slider. A conduit removal cord with a tab is included.

Other embodiments, in addition to the embodiments enumerated above, will become apparent from the following detailed description, taken in conjunction with the accompanying drawings, which illustrate, by way of example, the principles of the pet leash for donning and removing from a distance.

DETAILED DESCRIPTION

An illustrative embodiment of the present invention relates to a pet leash for donning and removing from a distance. The pet leash can be donned and removed without requiring the hands of the human user to be in close proximity to the animal. The pet leash remains securely attached until loosened by the human user pulling on the removal cord. The pet leash provides an easy and secure alternative to traditional leash options without requiring the human user touching or positioning their hands in close proximity to the animal, which will reduce the potential to get bitten by the animal. Additionally, the human user does not need to bend over or operate an attachment device, such as a spring buckle or snap hook found on tradition pet leashes, which is beneficial for users with mobility or dexterity issues.

FIGS. 1 through 7B, wherein like parts are designated by like reference numerals throughout, illustrate an example embodiment or embodiments of a pet leash for donning and removing from a distance, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment or embodiments disclosed, such as the size, shape, or type of elements or materials, in a manner still in keeping with the spirit and scope of the present invention.

Figure 1:
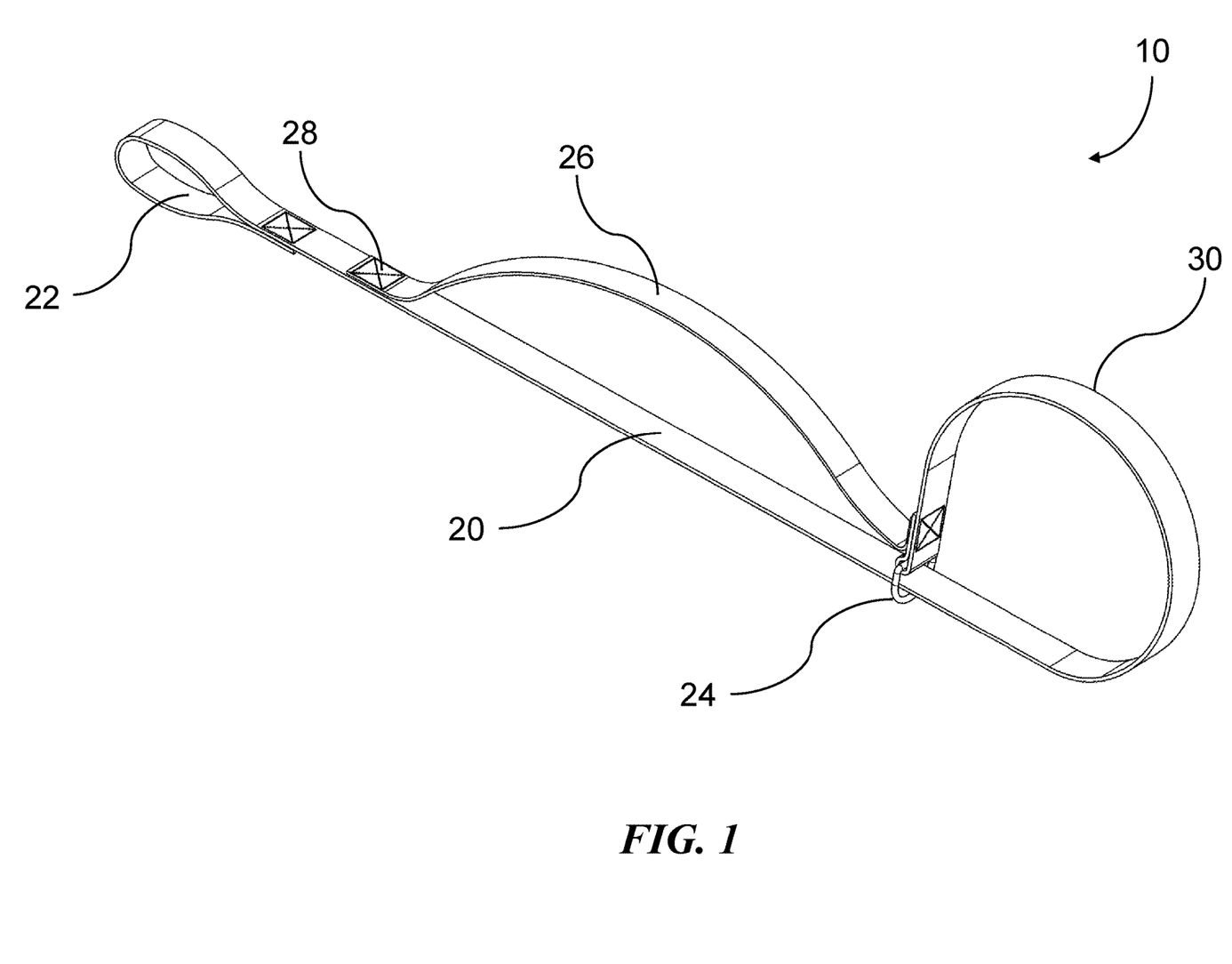
FIG. 1 is an isometric view of a pet leash with a loop and a removal cord.

FIG. 1 is an illustrative view of a leash 10 for pets that can be donned and removed from a distance in accordance with embodiments of the present invention. In the exemplary embodiments presented, the leash 10 is sized and dimensioned for use with a dog, although one of skill in the art will appreciate the present invention is applicable for use with any pet or animal for which a leash is appropriate, such as, but not limited to, cats, pigs, ferrets, rabbits, horses, ponies, guinea pigs, and the like.

Continuing with FIG. 1, the leash 10 is comprised of a primary cord 20 with a handle 22 at a first end and a slider 24 at a second end. The primary cord 20 is passed through the slider 24 to form a loop 30. The primary cord 20 can slidably pass through the slider 24 such that the loop 30 can be expanded and contracted. A first end of a removal cord 26 is attached to the slider 24 or attached to the primary cord 20 in close proximity to the slider 24 such that by pulling on the removal cord 26 in a general direction towards the handle 22 will cause the slider 24 to slide along the primary cord 20 towards the handle 22 to expand the loop 30. In an embodiment, a connection 28 at the second end of the removal cord 26, or in another location along the removal cord 26, is attached to the primary cord 20 of the leash 10 to keep the removal cord 26 in a known location for ease of use. In an embodiment, the connection 28 is attached at a fixed location on the primary cord 20, such as by sewing the second end of the removal cord 26 to the primary cord 20, and thus the length of the removal cord 26 will dictate a minimum size of the loop 30 as to not allow the loop 30 to overly contract around the neck of the animal. In yet another embodiment, the connection 28 is fixed to the second end of the removal cord 26, such as a D-ring or loop, that can slide along the primary cord 20 such that the loop 30 can contract around the neck of the animal to aid in controlling the animal as commonly done using slip-lead leashes or choke collars.

The exemplary embodiment described herein of a leash 10 for pets that can be donned and removed from a distance is comprised of materials, components, and fabrication methods commonly used for pet leashes, such as nylon webbing for the primary cord 20 and removal cord 26. It should be recognized by one of skill in the art that other materials for the primary cord 20 and removal cord 26 are also practicable, such as rope, cordage, leather, chain, and the like. The materials and cross-sectional dimensions of the primary cord 20 and removal cord 26 are substantially similar to those of typical pet leashes commercially available worldwide. The length of the primary cord 20 is substantially similar to common leashes, long-leads, retractable leashes, leash extensions, and the like, all commonly used for animals, such as dogs and the like. The length of the removal cord 26 is a length that allows the human user to grasp and pull the removal cord 26 with their hands a safe distance from the animal as previously described. Depending on the size of the animal, the length of the removal cord 26 can be as short as 6 inches or up to approximately as long as the primary cord 20, as would be appreciated by one of skill in the art.

The handle 22 as shown in FIG. 1 is formed by folding back and attaching, such as by sewing, the end of the primary cord 20 to itself to form a loop. One of skill in the art will appreciate that other fabrication methods or components, such as but not limited to, attaching an existing loop, handle, retractable cord device, leash hardware (including but not limited to a D-rings, snap hook, spring buckle, and other hardware commonly used with pet leashes and collars) and the like, to the end of the primary cord 20, can be used to create a handle 22 to be held by the human user of the leash 10, or attached to another leash or a stationary object, in keeping with the spirit and scope of the present invention.

The slider 24 as shown in FIG. 1 is comprised of a D-ring commonly used as a component for dog leashes and collars. One of skill in the art that other components, such as rings, washers, clips, carabiners, strap hardware, and the like, or fabrication methods, such as a loop of the primary cord 20 as previously described to form the handle 22, can be used to create a slider 24 that allows the primary cord 20 to freely slide through the slider 24. In an embodiment, the slider 24 is a tight fit on the primary cord 20 such that the friction between the slider 24 and the primary cord 20 prevents the slider 24 from sliding on the primary cord 20 without additional force applied, such as the force of the human user pulling the handle 22 of the leash 10 to contract the loop 30 around the neck of the animal, or the human user pulling on the removal cord 26 to enlarge the loop 30 to remove from the animal. Additional methods to prevent the slider 24 from sliding on the primary cord 20 without additional force applied, such as spring-loaded clamping mechanisms, flexible materials, and the like, are also practicable in keeping with the spirit and scope of the invention.

Figures 2A, 2B:
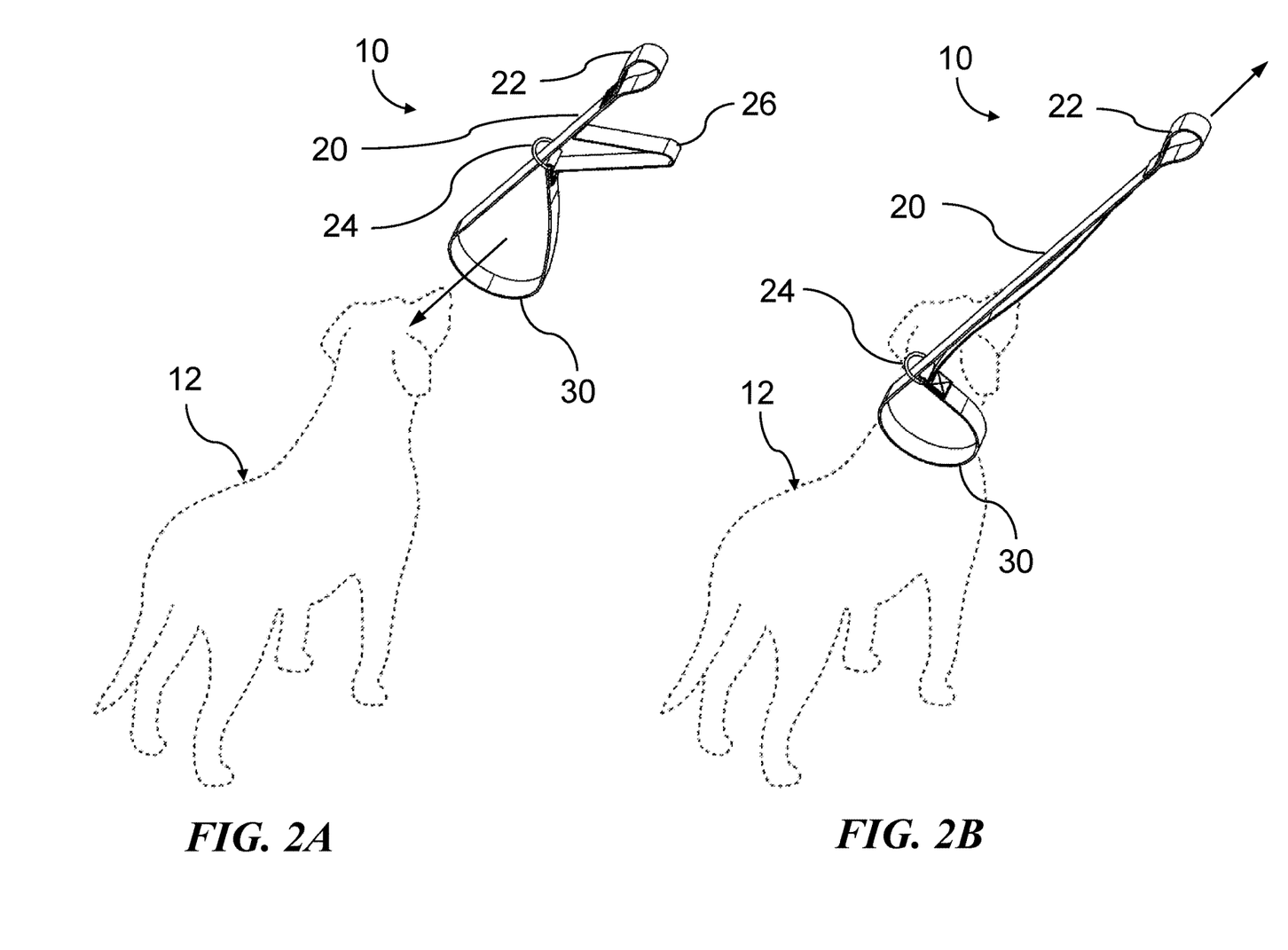
FIG. 2A is an isometric view of a pet leash with a removal cord with a loop in an open position for donning over the head of an animal.
FIG. 2B is an isometric view of a pet leash with a removal cord with a loop in a closed position around the neck of an animal.

FIGS. 2A through 2B illustrate the donning of a leash 10. As shown in FIG. 2A, the loop 30 is expanded by moving the slider 24 on the primary cord 20, by pulling the removal cord 26 or moving the slider 24 itself, toward the handle 22 such that the head of a dog 12 will easily fit through the loop 30 for donning. As shown in FIG. 2B, with the loop 30 positioned around the neck of the dog 12, the handle 22, or other location along the primary cord 20 between the handle 22 and the slider 24, is pulled to contract the loop 30 around the neck of the dog 12 to secure the leash 10.

Figure 3A:
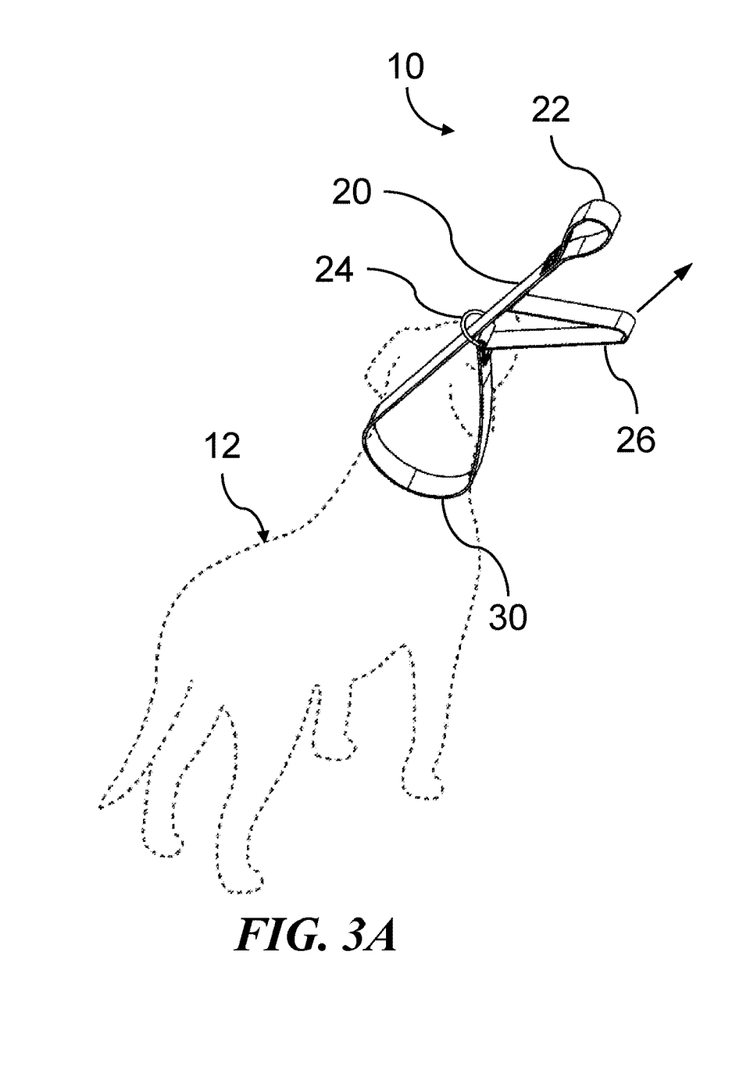
FIG. 3A is an isometric view of a pet leash with a removal cord with a loop in an open position for removing over the head of an animal.
Figure 3B:
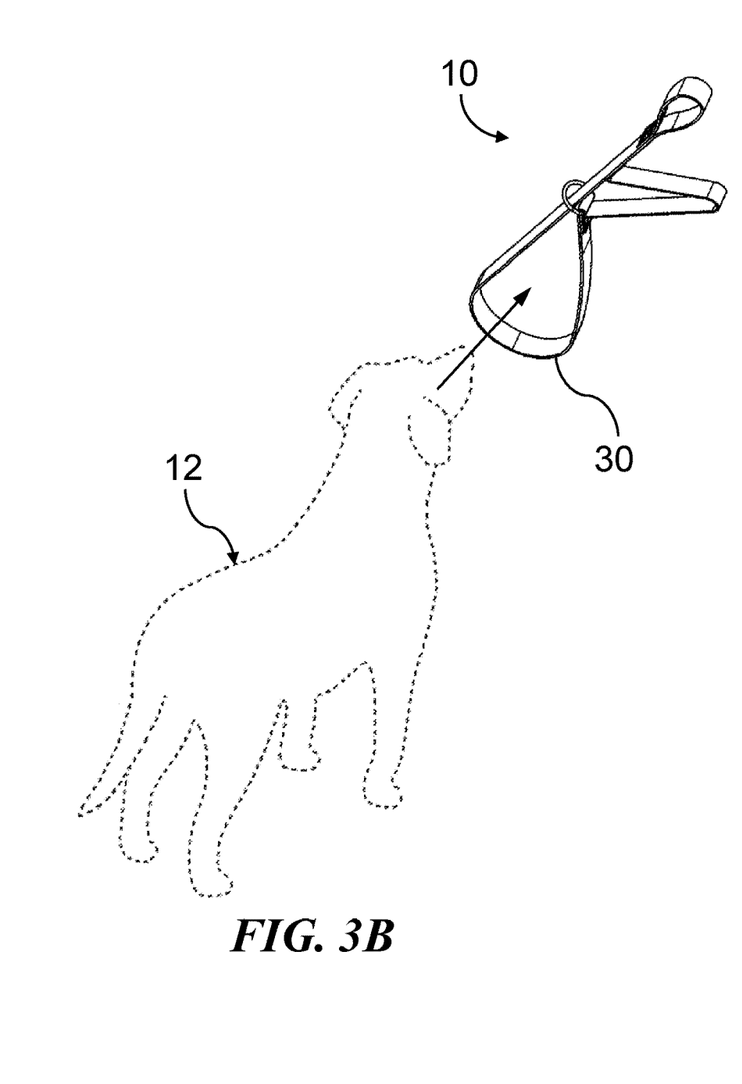
FIG. 3B is an isometric view of a pet leash with a removal cord with a loop in an open position having been removed over the head of an animal.

FIGS. 3A through 3B illustrate the removal of a leash 10. As shown in FIG. 3A, with the leash 10 secured around the neck of the dog 12, the removal cord 26 is pulled in a general direction towards the handle 22 such that the slider 24 will slide along the primary cord 20 towards the handle 22 to expand the loop 30. With the loop 30 expanded, the leash 10 can then be removed over the head of the dog 12, as shown in FIG. 3B.

Figures 4A, 4B:
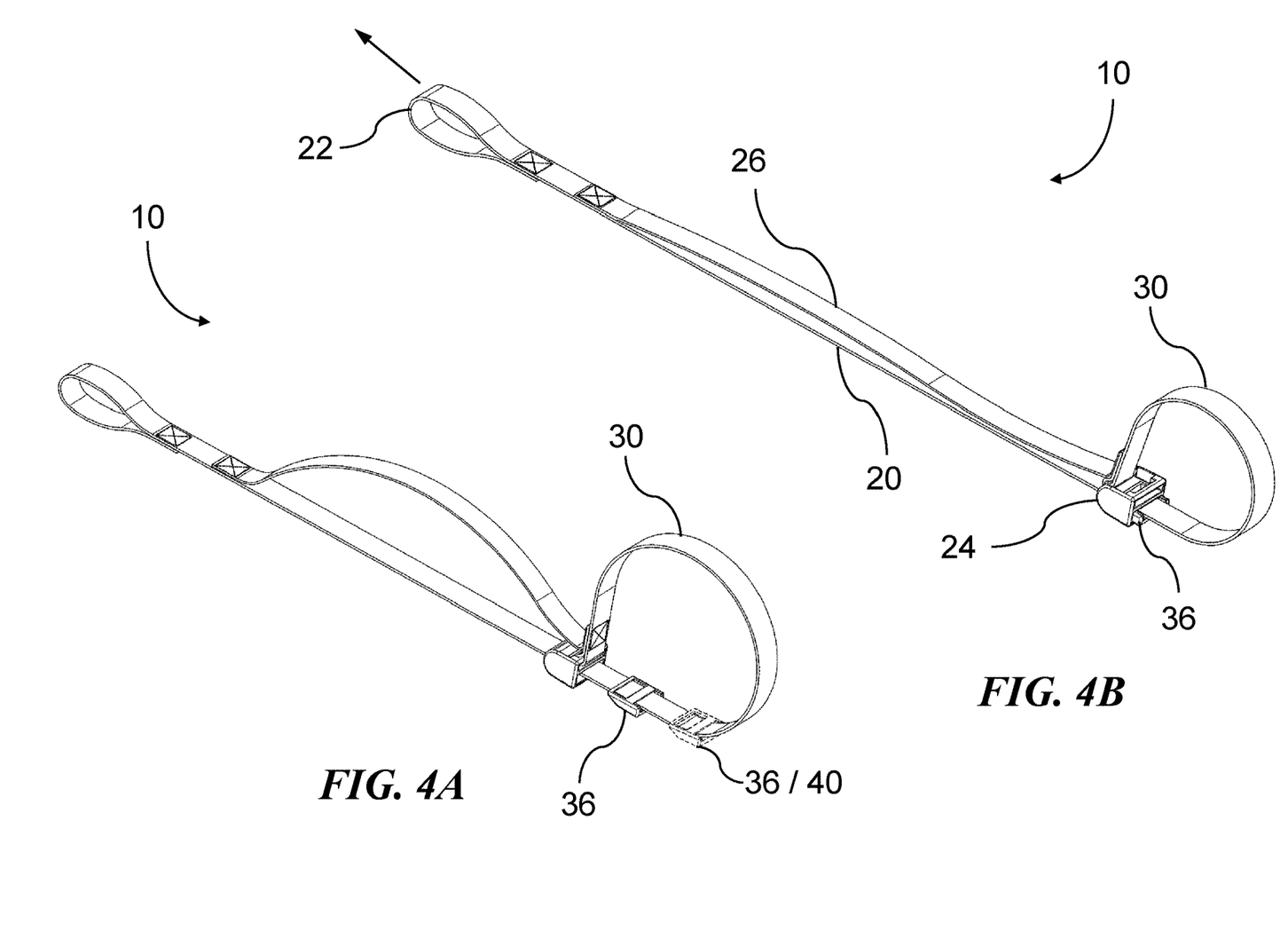
FIG. 4A is an isometric view of a pet leash with a loop, a removal cord, and a stop.
FIG. 4B is an isometric view of a pet leash with a loop, a removal cord, and a stop in connection to a slider.

FIGS. 4A through 4B illustrate an embodiment including a stop 36. As shown in FIG. 4A, the stop 36 is in a fixed position along the loop 30 of the leash 10. In an embodiment, the stop 36 can be in a permanently fixed position along the loop 30, such as the stop 36 sewn, glued, riveted, and like, to the loop 30. In another embodiment, the stop 36 is positionally fixed to along the loop 30, such as including features commonly found on nylon webbing components, such as a strap buckle, cam buckle, and the like, as would be appreciated by one of skill in the art. When the handle 22 of the leash 10 is pulled as previously described in FIG. 2B, the primary cord 20 slides through the slider 24 until the stop 36 connects with the slider 24, as shown in FIG. 4B. Once the stop 36 is connected to the slider 24, the loop 30 cannot be further contracted by pulling on the handle 22, or other location along the primary cord 20 between the handle 22 and the slider 24, of the leash 10. Thus, the position of the stop 36 along the loop 30 dictates the minimum size of the loop 30. As such, the positionally fixed stop 36 allows the human user to locate the stop 36 in a desired position 40 along the loop 30 prior to use to ensure an appropriate fit around the neck of the animal, as shown in FIG. 4A.

In one embodiment, the slider 24 and stop 36 have mating engagement features such that the slider 24 and stop 36 will remain connected until subjected to external separation force. In one embodiment of the leash 10, at least a portion of the stop 36 fits into an opening of the slider 24 and the connection of the slider 24 and the stop 36 is a friction fit, requiring a force to both engage (such as when pulling on the handle 22 of the primary cord 20) and separate (such as when pulling the removal cord 26) the connection. In another embodiment, the connection is secured using flexible tabs that will flex to engage or separate when subjected to an engagement or separation force. The design of such flexible tabs can require substantially equal forces to engage and separate, or alternatively, the design of such flexible tabs can require a lower force for engagement and a higher force to separate as is appreciated by one of skill in the art. In yet another embodiment, the connection of the slider 24 and the stop 36 is magnetic, such that the magnetic attraction will engage the slider 24 and stop 36 when brought within close proximity to each other, and will require a force to separate. One of skill in the art will appreciate that the given example methods for connection between the slider 24 and the stop 36 are described for clarity, but should not be considered to be limiting and other common methods for connecting that requires a force to separate are also practicable in keeping with the spirit and scope of the invention.

Figure 5:
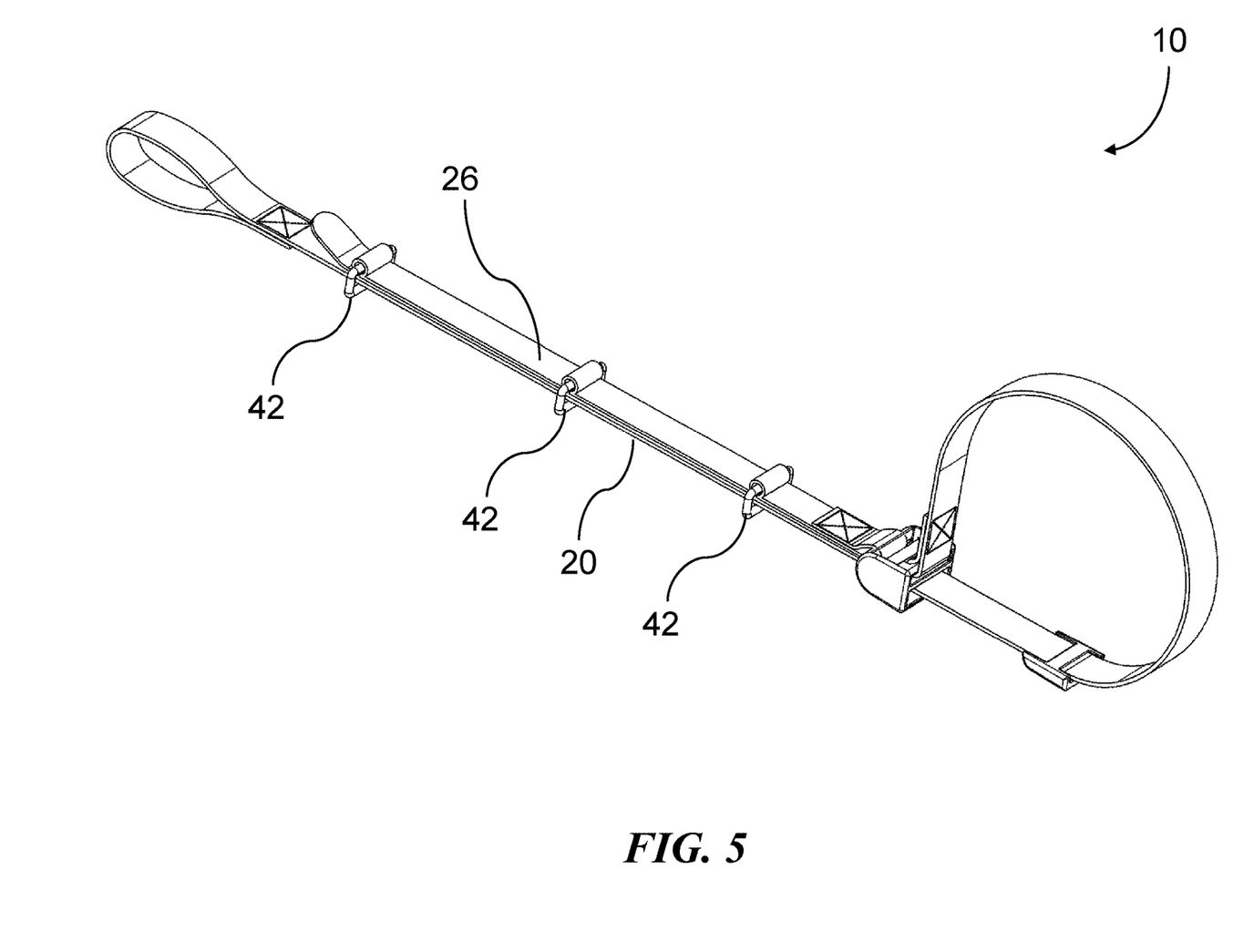
FIG. 5 is an isometric view of a pet leash with a loop, a stop, and a removal cord with holders.
Figures 6A, 6B:
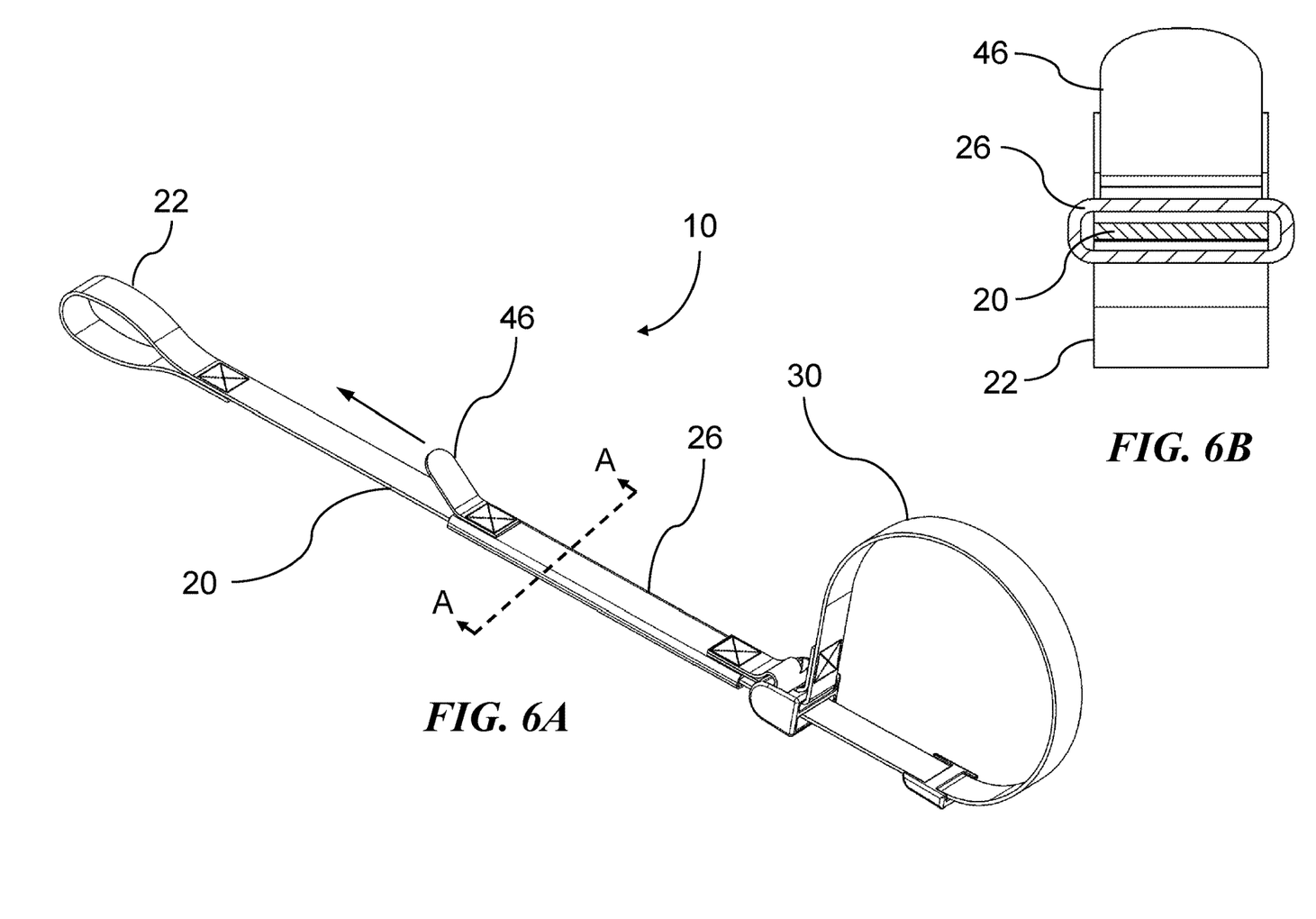
FIG. 6A is an isometric view of a pet leash with a loop, a stop, and conduit removal cord.
FIG. 6B is a cross-sectional view along Line A-A of pet leash of FIG. 6A.

In illustrative embodiments shown in FIGS. 5 through 6B, the removal cord 26 is contained such that it remains substantially along the primary cord 20 in a parallel relationship when the leash 10 is in use in order to keep the appearance of the leash 10 organized and increase usability. FIG. 5 illustrates a leash 10 with a series of holders 42. In an embodiment, the holders 42 are rings that are attached in a fixed position on the removal cord 26 and move slidably on the primary cord 20. Other types of holders 42, such as, but not limited to, a series of magnets along both the primary cord 20 and removal cord 26, are practicable as would be appreciated by one of skill in the art.

In an embodiment as shown in FIG. 6A, the removal cord 26 of the leash 10 is a tubular conduit sized such that the primary cord 20 can slidably pass through the tubular conduit of the removal cord 26. FIG. 6B is a cross-sectional view along Line A-A of FIG. 6A showing the primary cord 20 passing through the tubular conduit of the removal cord 26. In an embodiment, the conduit removal cord 26 is flexible, such as comprised of flexible materials previously described for the primary cord 20. In another embodiment, the conduit removal cord 26 is substantially rigid, such as comprised of plastic tubing, plastic pipe, and the like, as would be appreciated by one of skill in the art. In an embodiment as shown in FIG. 6A, the removal cord 26 includes a tab 46 to provide a convenient location for the human user to grasp to pull the removal cord 26 toward the handle 22 to expand the loop 30. The tab 46 is comprised of materials and fabrication methods previously described for the primary cord 20 and removal cord 26, such as nylon webbing, rope, cordage, leather, chain, and the like. In an embodiment, the tab 46 is part of the conduit removal cord 26 where the material is removed from the opposing side of the conduit removal cord 26 in the area of the tab 46. In another embodiment, the tab 46 is comprised of hardware commonly used with pet leashes and collars, such as but not limited to, D-rings, rings, washers, clips, carabiners, and the like, in keeping with the spirit and scope of the present invention.

Figure 7:
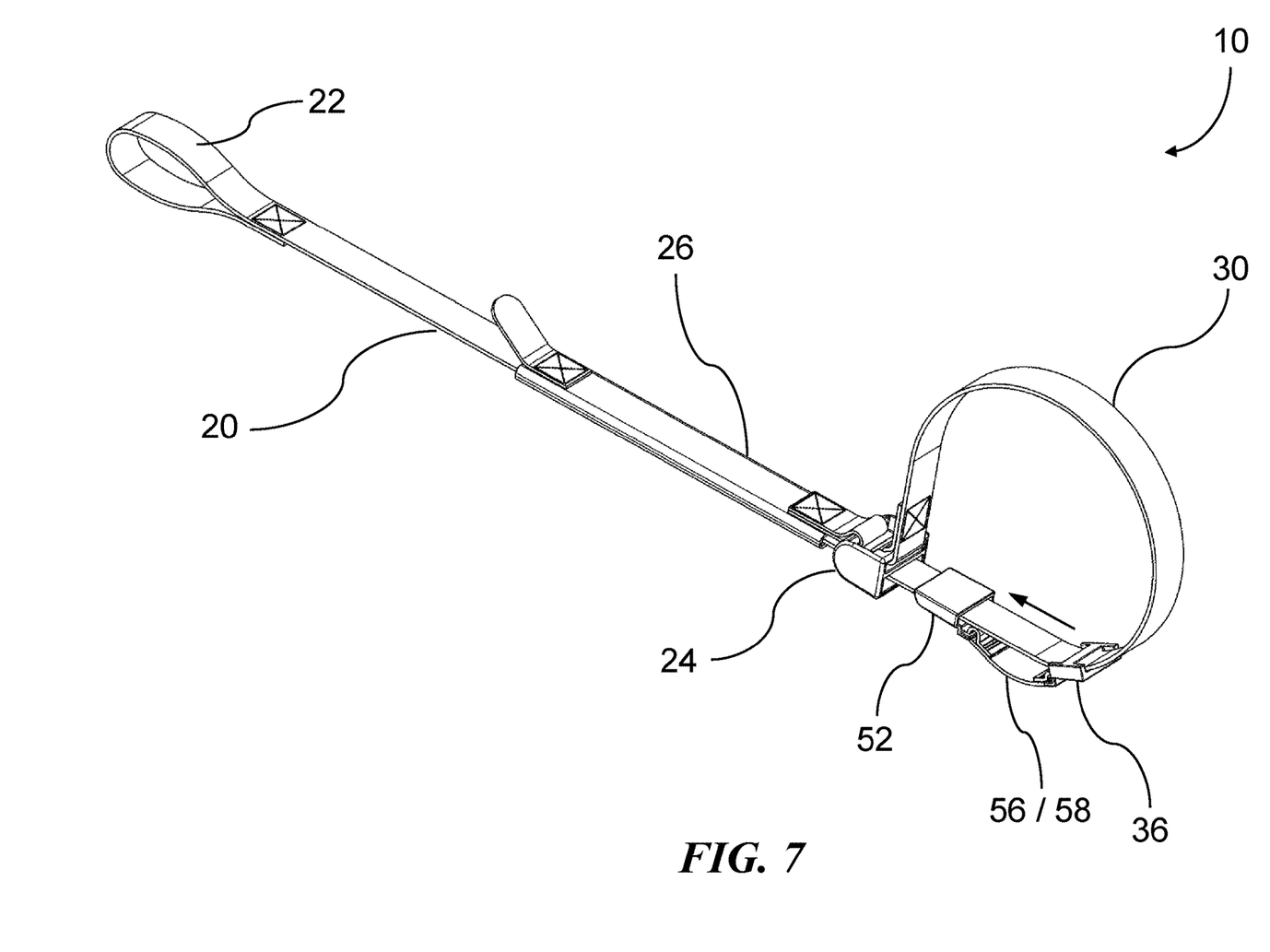
FIG. 7 is an isometric view of a pet leash with a loop, a conduit removal cord, and a stop and a sleeve connected by a tether.

A common method used to gain additional control of an animal on a leash is by using a slip-lead, choke collar, martingale collar, and the like, all of which are designed to constrict around the neck of the animal when the animal tries to pull away from an attached leash. FIG. 7 illustrates an embodiment of the present invention to add similar constriction control to a leash 10 with a removal cord 26 that can be donned and removed from a distance as previously described. A sleeve 52 is included that can slidably move along the loop 30 of the primary cord 20 and connect to the slider 24, such as by friction, flexible tabs, magnetic force, and the like, as previously described, such that a force is required to separate the connection between the sleeve 52 and slider 24. A stop 36 is attached to the loop 30 of the primary cord 20 in a fixed or positionally fixed position as previously described. A tether 56 is attached to both the sleeve 52 and stop 36. The tether 56 is made from a flexible material, for example, the same materials and sizes previously described for the primary cord 20, such that the tether 56 limits the maximum distance that the sleeve 52 can slide away from the stop 36, yet the tether 56 is flexible enough to allow the sleeve 52 to slide closer to, such as in contact with, the stop 36. The length of the tether 56, for example, a length of 2 inches, allows for the loop 30 to be a comfortable fit around the neck of the animal, such as the typical fit of a dog collar, when there is no tension applied to the primary cord 20 of the leash 10. The example length of the tether 56 is given for illustrative purposes, and other lengths, such as lengths from 0.5 inches to 6 inches, may be practicable as would be appreciated by one of skill in the art. In an embodiment, to ensure the loop 30 does not remain constricted around the neck of the animal, the slidable sleeve 52 is biased to a separated position from the stop 36 by a separator 58, as shown in FIG. 7. In an embodiment, the tether 56 is composed of elastically deformable material such that the tether 56 and separator 58 are one and the same, as shown in FIG. 7. In another embodiment, the separator is a spring, an elastically deformable member, opposing magnetic force, and the like, as would be appreciated by one of skill in the art.

Figures 8A, 8B:
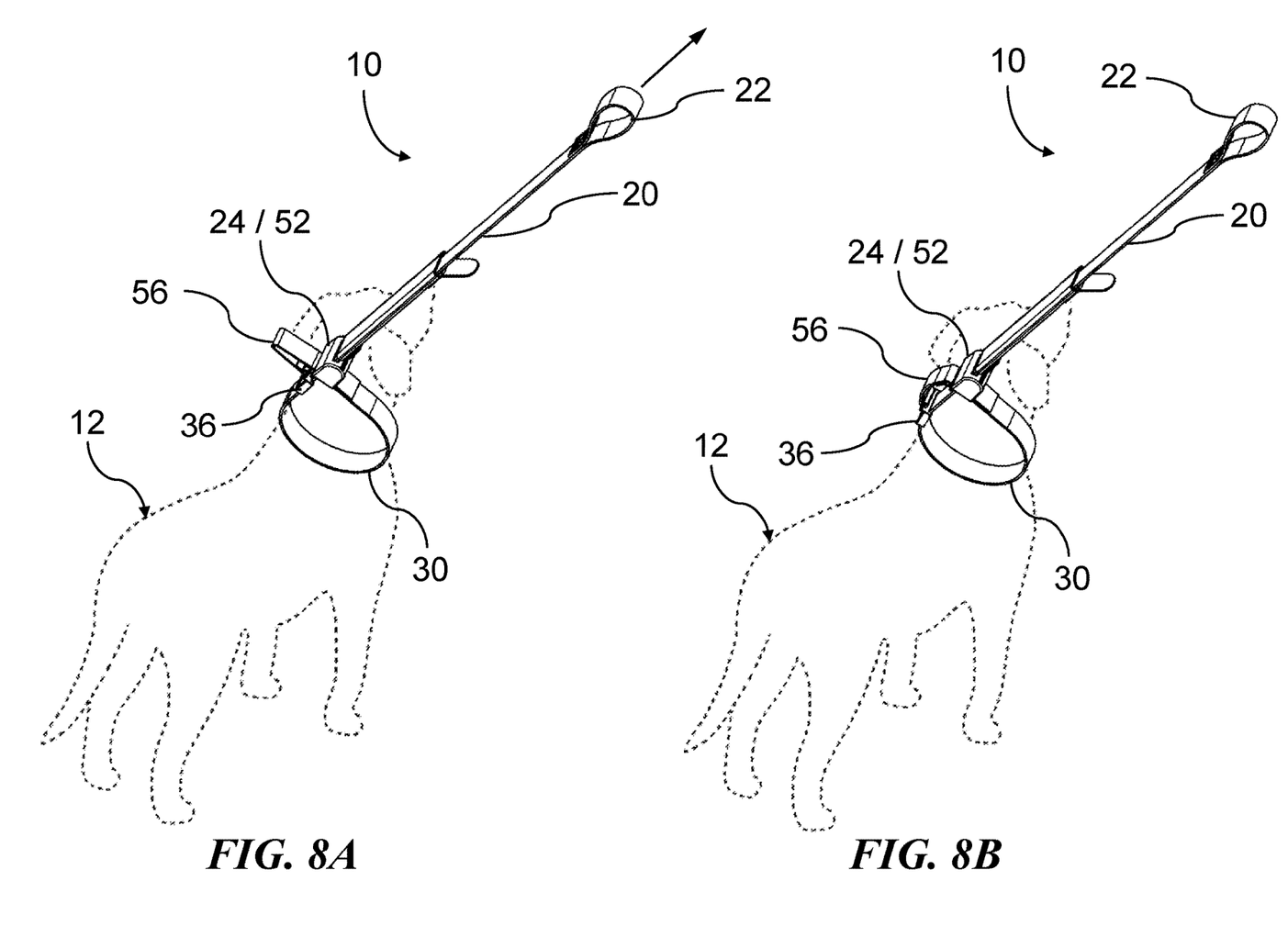
FIG. 8A is an isometric view of a pet leash with a loop, a conduit removal cord, and a stop and a sleeve connected by a tether, in a constricted state around the neck of an animal.
FIG. 8B is an isometric view of a pet leash with a loop, a conduit removal cord, and a stop and a sleeve connected by a tether, in an unconstricted state around the neck of an animal.

As shown in FIG. 8A, the loop 30 of the leash 10 is contracted around the neck of the dog 12 by pulling on the handle 22, or other location along the primary cord 20 between the handle 22 and the slider 24. The stop 36, in a fixed position along the loop 30, will push the sleeve 52 until the sleeve 52 connects with the slider 24 as previously described. In this position, the loop 30 will be sized to be slightly constricting the neck of the dog 12. With the sleeve 52 connected to the slider 24, once there is no tension on the primary cord 20, the neck of the dog 12 will force the primary cord 20 to slide through the sleeve 52, allowing the stop 36 to move away from the sleeve 52, thus slightly expanding the size of the loop 30 so that it is no longer constricting the neck of the dog 12, as shown in FIG. 8B. The tether 56 limits the distance between the sleeve 52 and the stop 36 to limit the size of the loop 30 when no tension is being applied to the primary cord 20, such that the loop 30 is a secure and comfortable fit around the neck of the dog 12 as previously described. When tension is again applied to the primary cord 20, such as by the dog 12 pulling away or the human user pulling on the handle 22, the primary cord 20 will slide through the sleeve 52 to decrease the size of the loop 30 to constrict around the neck of the dog 12 as previously shown in FIG. 8A. The amount of constriction is limited by the stop 36 coming in contact with the sleeve 52 or slider 24.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also understood that the following claims are to cover all generic and specific features of the invention described herein, and all statements of the scope of the invention which, as a matter of language, might be said to fall therebetween.

In terms of use, a method for restraining a pet includes providing a leash 10 including a primary cord 20 having a first end and an opposite second end, a handle 22 disposed at the first end of the primary cord 20, a slider 24 disposed at the second end of the primary cord 20, the slider 24 slidably receiving the primary cord 20 to form a loop 30, the slider 24 positionable along the primary cord 20, and a removal cord 26 having a first end and an opposite second end, the first end of the removal cord 26 connected to the slider 24. The removal cord 26 is pulled to expand the loop 30 to a size which can receive the pet. The loop 30 is then placed around the pet without touching the pet, and then the primary cord 20 is pulled to close the loop 30 around the pet.

In terms of use, the method further including the leash 10 including the second end of the removal cord 26 connected to the primary cord 20.

In terms of use, the method further including removing the loop 30 from the pet without touching the pet after pulling the removal cord 26 to expand the loop 30.

In terms of use, the method further including the leash 10 including a stop 36 connected to the loop 30. The stop 36 is configured to form a connection with the slider 24 and thereby define a minimum size loop 30. The stop 36 is positionable along the loop 30 such that the stop 36 is positioned at a desired location on the loop 30 prior to placing the loop 30 around the pet.

In terms of use, the method further including the connection between the stop 36 and the slider 24 being magnetic.

In terms of use, the method further including the removal cord 26 including a conduit through which the primary cord 20 passes. The conduit removal cord 26 includes a tab 46 which is used to pull the removal cord 26.

What is claimed is:

1. A leash for a pet comprising:
    a primary cord having a first end and an opposite second end;
    a handle disposed at said first end of said primary cord;
    a slider disposed at said second end of said primary cord, said slider slidably receiving said primary cord to form a loop, said slider positionable along said primary cord; and,
    a removal cord having a first end and an opposite second end, said first end of said removal cord connected to said slider.

2. The leash for a pet according to claim 1 further including:
    a junction of said slider with said primary cord having friction so that a force is required to move said slider along said primary cord.

3. The leash for a pet according to claim 1 further including;
    said second end of said removal cord connected to said primary cord.

4. The leash for a pet according to claim 1 further including:
    a stop connected to said loop; and,
    said stop configured to form a connection with said slider and thereby define a minimum loop size.

5. The leash for a pet according to claim 4 further including:
    said stop positionable along said loop.

6. The leash for a pet according to claim 4 further including:
    a force required to break said connection of said stop and said slider.

7. The leash for a pet according to claim 4 further including:
    said connection being magnetic.

8. The leash for a pet according to claim 1 further including:
    a plurality of holders which keep said primary cord and said removal cord in parallel relationship.

9. The leash for a pet according to claim 1 further including:
    said removal cord including a conduit through which said primary cord passes.

10. The leash for a pet according to claim 9 further including:
    said removal cord being rigid.

11. The leash for a pet according to claim 9 further including:
    said conduit including a tab.

12. The leash for a pet according to claim 1 further including:
    a stop connected to said loop;
    a sleeve slidably connected to said loop, said sleeve configured to form a connection with said slider; and,
    a tether connected between said stop and said sleeve.

13. The leash for a pet according to claim 12 further including:
    a force required to break said connection of said sleeve and said slider.

14. The leash for a pet according to claim 12 further including:
    said connection being magnetic.

15. The leash for a pet according to claim 12 further including:
    said stop and said sleeve being biased to a separated position.

16. The leash for a pet according to claim 1 further including:
    a stop connected to said loop;
    said stop configured to form a connection with said slider;
    said stop positionable along said loop;
    a force required to break said connection of said stop and said slider;
    said connection being magnetic;
    said removal cord including a conduit through which said primary cord passes; and,
    said conduit including a tab.

17. A method for restraining a pet comprising:
    (a) providing a leash including:
        a primary cord having a first end and an opposite second end;
        a handle disposed at said first end of said primary cord;
        a slider disposed at said second end of said primary cord, said slider slidably receiving said primary cord to form a loop, said slider positionable along said primary cord;
        a removal cord having a first end and an opposite second end, said first end of said removal cord connected to said slider;
    (b) pulling said removal cord to expand said loop to a size which can receive the pet;

(c) without touching the pet, placing said loop around the pet; and,
(d) pulling said primary cord to close said loop around the pet.

18. The method of claim 17, further including:
in (a), said second end of said removal cord connected to said primary cord.

19. The method of claim 17 further including:
after (d), pulling said removal cord to expand said loop; and,
without touching the pet, removing said loop from the pet.

20. The method of claim 17 further including:
in (a), a stop connected to said loop;
in (a), said stop configured to form a connection with said slider and thereby define a minimum size loop;
in (a), said stop positionable along said loop; and,
before (c), positioning said stop to a desired location on said loop.

21. The method of claim 20 further including:
in (a), said connection being magnetic.

22. The method of claim 17 further including:
in (a), said removal cord including a conduit through which said primary cord passes, said conduit including a tab; and,
in (b), using said tab to pull said removal cord.

* * * * *